(12) United States Patent
Shivananda et al.

(10) Patent No.: US 7,979,297 B1
(45) Date of Patent: Jul. 12, 2011

(54) ORDER TRACKING AND REPORTING TOOL

(75) Inventors: Sunitha Shivananda, Olathe, KS (US); Michael Gittrich, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2162 days.

(21) Appl. No.: 10/272,423

(22) Filed: Oct. 16, 2002

Related U.S. Application Data (60) Provisional application No. 60/404,788, filed on Aug. 19, 2002.

(51) Int. Cl.
 *G06Q 10/00* (2006.01)
(52) U.S. Cl. .................................................. 705/7.27
(58) Field of Classification Search .................. 705/7, 8, 705/11
See application file for complete search history.

(56) References Cited

U.S. PATENT DOCUMENTS

| | | | | |
|---|---|---|---|---|
| 6,026,365 | A * | 2/2000 | Hayashi | 705/9 |
| 6,092,049 | A * | 7/2000 | Chislenko et al. | 705/10 |
| 6,321,133 | B1 * | 11/2001 | Smirnov et al. | 700/100 |
| 6,343,275 | B1 * | 1/2002 | Wong | 705/26 |
| 6,415,194 | B1 * | 7/2002 | Gleditsch et al. | 700/99 |
| 6,578,006 | B1 * | 6/2003 | Saito et al. | 705/9 |
| 6,684,213 | B1 * | 1/2004 | Schell et al. | 707/10 |
| 6,850,530 | B1 * | 2/2005 | Waclawsky et al. | 370/401 |
| 6,957,190 | B1 * | 10/2005 | Sakayori et al. | 705/16 |
| 6,980,963 | B1 * | 12/2005 | Hanzek | 705/26 |
| 7,171,373 | B2 * | 1/2007 | Lahey et al. | 705/7 |
| 7,624,033 | B1 * | 11/2009 | Jean et al. | 705/7 |
| 2002/0059090 | A1 * | 5/2002 | Yanagimachi | 705/8 |
| 2002/0077842 | A1 * | 6/2002 | Charisius et al. | 705/1 |
| 2003/0033191 | A1 * | 2/2003 | Davies et al. | 705/10 |
| 2003/0115087 | A1 * | 6/2003 | Ueno | 705/7 |
| 2003/0171907 | A1 | 9/2003 | Gal-On et al. | |
| 2003/0225595 | A1 * | 12/2003 | Helmus et al. | 705/2 |
| 2005/0257136 | A1 * | 11/2005 | Charisius et al. | 715/511 |

OTHER PUBLICATIONS

Fulton, Sams Teach Yourself Microsoft Excel 2000 in 10 Minutes, Apr. 30, 1999, Lesson 27, Adding Hyperlinks to a Worksheet.*
Vitria Business Cockpit Brochure, 2001.
Vitria Communicator Data Sheet, 2001.
Vitria Communicator Product Brief, 2001.
Vitria Architecture Overview, May 22, 2002.
Bessler, James E., et al., "Business Activity Monitoring Tool," Filed Mar. 23, 2004, U.S. Appl. No. 10/806,909.
Restriction Requirement dated Dec. 12, 2008 (7 pages), U.S. Appl. No. 10/806,909, filed Mar. 23, 2004.
Office Action dated Nov. 23, 2009 (35 pages), U.S. Appl. No. 10/806,909, filed Mar. 23, 2004.
Advisory Action dated Feb. 16, 2010 (3 pages), U.S. Appl. No. 10/806,909, filed Mar. 23, 2004.
Office Action dated Feb. 16, 2011, U.S. Appl. No. 10/806,909 filed Mar. 23, 2004 [IDF 2475 (4000-14200)].

* cited by examiner

*Primary Examiner* — Justin M Pats (57) ABSTRACT

A computerized workflow analysis tool, which allows a user to navigate through many levels of increasingly detailed order-related information. The order tracking and reporting tool of the preferred embodiments further allow a user to create customized, ad-hoc reports. In addition, the preferred embodiments allows a user to search information obtained from a plurality of databases by selected parameters, and to download the results obtained for further mathematical manipulation, graphing or trend analysis.

18 Claims, 12 Drawing Sheets

| | A | B | C | D | E |
|---|---|---|---|---|---|
| 1 | Order ID | SOG | Customer | Customer | Want Date |
| 2 | 5045889 | 667055 | Tax Tronic | 4-Jul-05 | |
| 3 | 5046168 | 661881 | Kansas Ci | 25-Dec-05 | |
| 4 | 5044839 | 660704 | Garg Herw | 25-Dec-05 | |
| 5 | 5044044 | 661011 | VERGER I | 4-Jul-05 | |
| 6 | 5039767 | 658867 | THE DECL | 8-May-05 | |
| 7 | 5036522 | 657314 | Herb Ritts | 4-Jul-05 | |
| 8 | 5029568 | 655263 | Bernard Fa | 4-Jul-05 | |
| 9 | 5028631 | 654733 | HANKINS | 4-Jul-05 | |
| 10 | 5014028 | 649956 | Ethicon en | 4-Jul-05 | |
| 11 | 5009786 | 647275 | CK Motors | 4-Jul-05 | |
| 12 | 5086313 | 675936 | METRO BI | 9-May-02 | |
| 13 | 5086477 | 675415 | hinsdale m | ##### | |
| 14 | 5086755 | 675013 | JACOBSE | ##### | |
| 15 | 5086959 | 675489 | BOB PIER | 7-May-02 | |
| 16 | 5081315 | 675493 | D AND R I | 9-May-02 | |
| 17 | 5087608 | 675794 | allen mark | ##### | |
| 18 | 5087782 | 675791 | Velvet doc | ##### | |
| 19 | 5087912 | 675809 | Covington | ##### | |
| 20 | 5080039 | 675823 | kollar finan | 8-May-02 | |
| 21 | 5088153 | 676037 | Global Dis | 9-May-02 | |
| 22 | 5084406 | 676138 | Steven D E | ##### | |
| 23 | 5089096 | 676269 | Bristol Fib | ##### | |
| 24 | 5082318 | 673598 | Masonmac | 30-Apr-02 | |
| 25 | 5083218 | 673998 | C CONSUI | 25-Dec-05 | |
| 26 | 5083312 | 674291 | Get outsi | 7-May-02 | |
| 27 | 5083446 | 674284 | thrifty print | 25-Dec-05 | |
| 28 | 5083629 | 673765 | SUN FEDE | 25-Dec-05 | |
| 29 | 5084288 | 674498 | PhotoWeb | ##### | |
| 30 | 5084331 | 674506 | bay copy | 8-May-02 | |
| 31 | 5084367 | 674922 | Apartment | 25-Dec-05 | |
| 32 | 5084699 | 674487 | Westside | 8-May-02 | |

ORDER TRACKING AND REPORTING TOOL

CROSS-REFERENCE TO RELATED APPLICATIONS

This application claims priority to Provisional Application 60/404,788 filed Aug. 19, 2002 entitled "Telecom Provisioning Workflow Models" which is incorporated by reference.

BACKGROUND

The preferred embodiments of the present invention relate generally to improvements in information technology. More particularly, the preferred embodiments relate to a method and related system for tracking, archiving and reporting information related to a business workflow. More particularly, the preferred embodiments relate to a web-based graphical user interface for tracking, archiving, and reporting information related to a business process object, or order, moving through a workflow.

A workflow is a largely automated set of relationships between tasks related to the completion of a business process object from start to finish. A business process object is a single instance of a business process (e.g. a customer's order for a product or service). Tasks may be triggered by automated messages or alternately, by manual interaction. Workflow management, which relates to the coordination of business tasks, or processes, is an emerging technology closely associated with corporate streamlining activities. Fundamentally, it is an information technology model for reducing business costs, improving operation efficiency, and facilitating an adaptive business organization.

In a workflow, business processes (e.g. order processing, product delivery scheduling) are generally defined in such a way that they can be directly interpreted and executed by a workflow manager, which can take the form of one or more central servers. A major inhibitor to the development of workflow is understanding the mechanisms, interactions and inter-relationships of these tasks, as even small businesses may develop hundreds of such tasks as a workflow matures.

Many customer-oriented businesses rely on largely automated procedures for receiving, tracking and completing a customer order. With large businesses processing hundreds of thousands of orders per month, it is vital to ensure that orders are processed efficiently in order to preserve customer satisfaction. Tracking and reporting data ensures that orders are not accumulating at any one step without any forward progress through the workflow. Identifying congested workflow states, or bottlenecks, that block the forward progress of other orders is important to recognizing workflow areas that need increased headcount or computing capacity. For example, if it is determined that many orders are being received for new telephone service, but only a small percentage are being queued for implementation, steps can be taken to proactively improve order fulfillment. As it would be time-consuming to monitor the status of each individual order, it is desirable to track and archive data that can be analyzed for trends or bottlenecks.

A key to maintaining customer satisfaction is the ability to query the real-time status of any order and identify its present state within the workflow, so that the status may be reported to the customer on demand. It is also desirable to be able to research all orders for a particular customer, across all processes within the workflow. It is also desirable to record the time it takes for an order to transition from state to state within the workflow. In addition to providing data to analyze for process optimization, historical data could also contribute to more accurate business forecasting by assisting in predicting future peak order periods, for example, so that they may be adequately prepared for. Collecting real-time data as well as historical data may be complicated by the existence of data on multiple systems with differing architectures. Historically, there has been no systematic, efficient way to access the level of order information desired across a multitude of legacy systems. The ability to generate reports on demand, as well as customized reports detailing specific parameters, is also desirable. Many conventional order tracking and reporting databases generate periodic planned reports, but it is further desired to generate customized, ad-hoc reports.

BRIEF SUMMARY

The problems noted above are solved in large part by a system and related method for tracking, archiving, and reporting information related to a business workflow. More particularly, the preferred embodiments relate to a web-based graphical user interface for tracking, archiving, and reporting information related to a business process object, or order, within a workflow. It is therefore desired to provide a web-based order tracking and reporting tool which allows users to access a variety of order-related details, through many levels of information, to download or print data, and to create customized reports on demand.

The disclosed devices and methods comprise a combination of features and advantages that enable it to overcome the deficiencies of the prior art. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular operations or computing entities. As one skilled in the art will appreciate, information technology companies may refer to computing processes, components, and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ."

The term "computer" is intended to mean a computing entity, which may be a server, terminal, personal or other computer, or a network of computing entities working together as a unit. The term "workflow" refers to a series of operations and the order in which they are performed. The term "server" refers to a computing entity which is generally linked to and performing some service for one or more computing entities. The terms "task" refers to individual operations in the workflow. The term "system" refers to a computing entity designated to perform workflow tasks. The term "workflow manager" refers to one or more servers acting as a central clearinghouse to coordinate the workflow between a plurality of peripheral computing systems. The term "database" refers to a computing entity housing a large collection of data organized for rapid search and retrieval.

The term "application" refers to an executable software package or program that can be run on a system. The term "interface" refers to a mode of interaction between a user and computer, or alternately, between two computing systems or applications. The term "console" refers to a computing entity with which a user can actively interact. The term "channel" refers to a data structure and associated software processes that together form a communications pathway between different processes and/or different systems. The term "event" refers to a basic messaging unit, sent through a channel, which triggers a workflow operation and/or communicates information between the workflow manager and linked systems. To the extent that any term is not specially defined in this specification, the intent is that the term is to be given its plain and ordinary meaning.

DETAILED DESCRIPTION OF THE PREFERRED EMBODIMENTS

The preferred embodiments of the present invention disclose a method and related system for tracking, archiving, and reporting information related to a business process object (hereafter, "order") within a business workflow. The preferred embodiments enable a user to track, archive and report order information through a web-based computer interface. Order processing is generally coordinated between numerous systems by a central workflow manager. Generally, a central workflow manager acts as a central clearinghouse to coordinate messages between numerous individual systems. The workflow manager is linked with each system by one or more "channels," which are communications pathways for delivering queued event-based messages between the workflow manager and peripheral systems, as well as between different processes within the workflow manager. Typically, the workflow manager will place an event into a channel, where the event will remain until it is retrieved by the target system. The event may have a set expiration period, so that it will not be enacted if not retrieved by a certain deadline, or may alternately be a guaranteed-delivery event, which will not expire.

After retrieving and acting on an event, a system may insert another event designated for the workflow manager into a return channel. Once the event is retrieved by the workflow manager, the workflow manager may recognize that a certain task has been performed. The workflow manager will then address the next task in the workflow by placing a subsequent event into a channel designated for the next targeted system. Events may pass to or from the workflow manager, depending on the system for which they are targeted. Essentially, the workflow manager follows a set procedure for notifying various systems of tasks to be performed, receiving confirmation that the events reached their destinations and following up with subsequent tasks.

Figure 1:
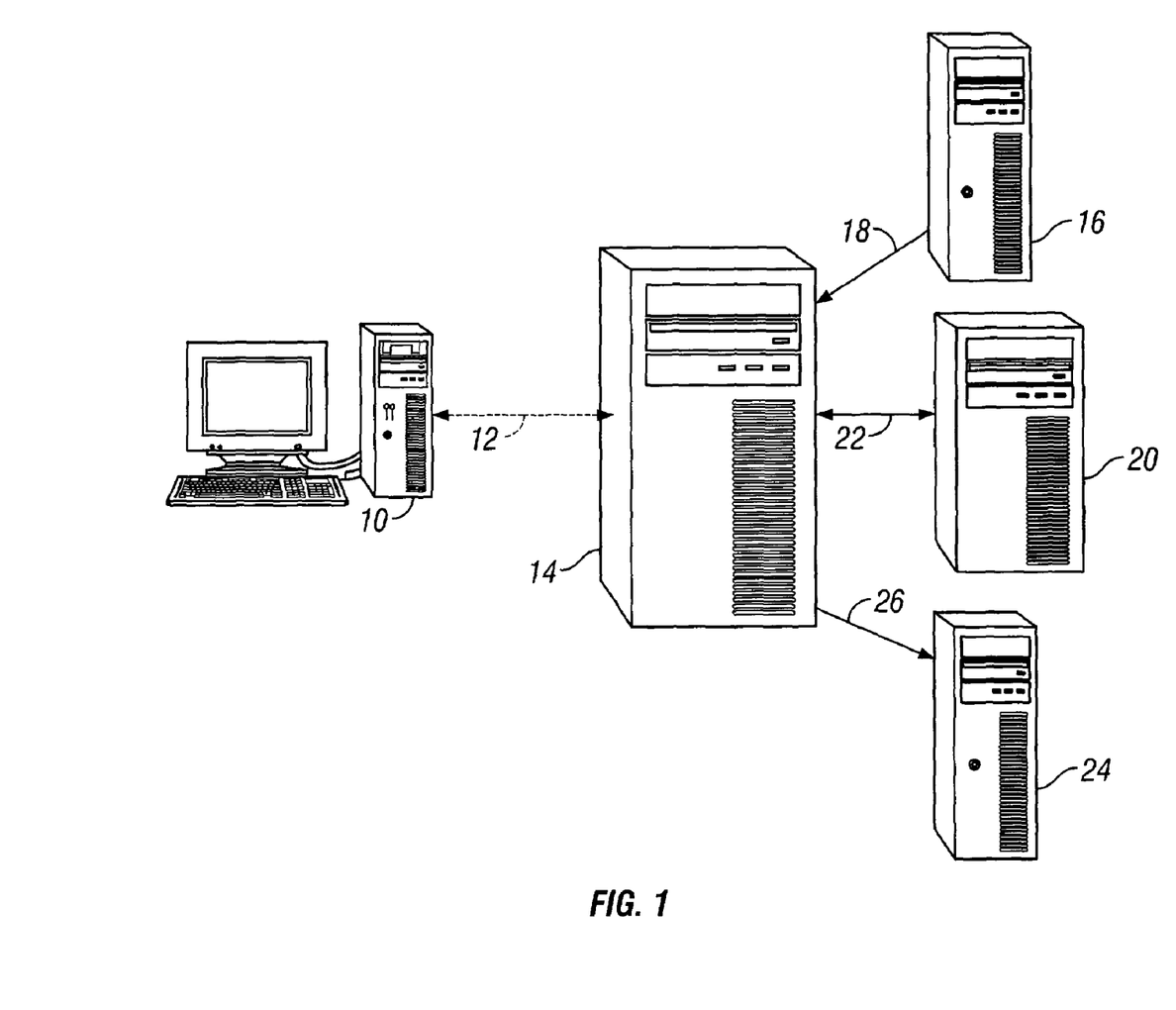
FIG. 1 shows a user interface linked with a workflow manager and peripheral systems.

Referring now to FIG. 1, user interface 10 is linked to central workflow manager 14 by net 12, which is a computing connection that may include an intranet, an interne, local-area network (LAN) or wide-area network (WAN) connection. In one preferred embodiment, interface 10 is a web-based console featuring a graphical user interface, which may communicate information to a user in the form of a web page or a plurality of frames within a web page. However, it will be understood that interface 10 may alternately possess a terminal interface or any number of traditional computing interfaces, such as that of a standard desktop software package. Further, software for the graphical user interfaces of the preferred embodiments may be communicated to a user interface 10 by an information-carrying medium, such as a floppy disk, CD-ROM, or network connection placed in operational relation with a computer.

Central workflow manager 14 includes one or more servers that receive and send out event-based messages, or "events," to communicate between internal processes and a multitude of linked systems. Events are associated with transitions of an order from one workflow state to another, marking the progress of the order through the workflow. In the simplified setup shown in FIG. 1, a task such as new order entry may be performed at system 16. An event may then be placed into channel on workflow manager as denoted by arrow 18. The event may remain in the channel for a period of time until it is retrieved or expires. It will be understood that arrows 18, 22, 26 in FIG. 1 represent channels and not physical connections.

The event in channel 18 is typically retrieved by workflow manager 14, which then recognizes that a certain task has been performed and that a subsequent action (e.g. product shipping) needs to be taken. Assuming that system 20 handles tasks associated with product shipping, an event might be placed into channel 22, where it is retrieved by system 20. This event may trigger an action at system 20, such as a product shipping procedure. System 20 may then recognize that it must confirm completion of this action in order for the next step in the workflow to take place, and consequently places a subsequent event, such as "shipped today," into channel 22. Once retrieved by workflow manager 14, a follow-up event, such as "order completed," may then be placed into channel 26 by the workflow manager. System 24 may then retrieve the follow-up event and perform an associated task (e.g. billing).

Figure 2:
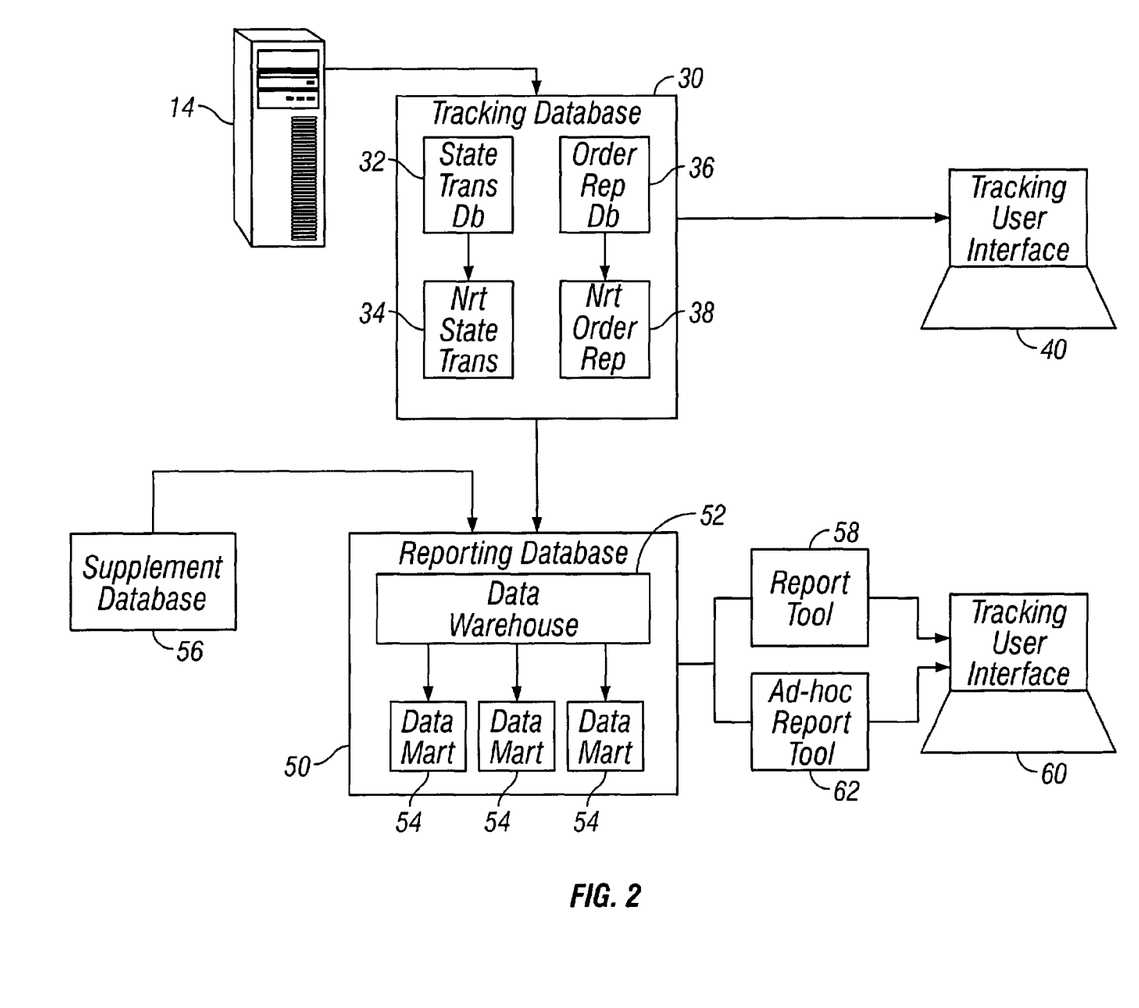
FIG. 2 shows a workflow manager linked with a workflow analysis tool in accordance with the preferred embodiments.

FIG. 2 shows a simplified layout of a preferred embodiment of an order reporting and tracking tool linked with a workflow manager. Central workflow manager 14 deposits order state information into tracking database 30, which further comprises a plurality of databases: real-time state transition database 32, state transition replica database 34, real-time order repository database 36, and order repository replica database 38. State and transition information is stored by state transition database 32, while order and customer information is stored within order repository database 36. State transition replica database 34 is downstream from state transition database 32, and is a near-real-time replica of the state transition database. Similarly, order repository replica database 38 is a near-real-time replica downstream from order repository 36. Information from real-time databases 32 and 36 is periodically downloaded into the near-real-time replica databases, 34 and 38, respectively, so that tracking and reporting data can be accessed without impacting the performance of order provisioning, which updating the real-time databases might cause. Data from tracking database 30 can be accessed by a user at tracking user interface 40. Together, real-time databases 32 and 36 contain most of the data about an order.

Data from tracking database 30 is fed into reporting database 50, which includes data warehouse 52 and several datamarts 54. The datamarts 54 contain data pre-processed into a form convenient to put into a report. Information desired for creating a report that is not contained in the data obtained so far may be provided by one or more supplementary databases 56, which may feed into reporting database 50, either directly or through another database. Data from reporting database 50 can be fashioned into reports at reporting user interface 60. Conventional reports may be generated by reporting tool 58, which allows a user to put retrieved data into an intelligible format. Alternately, customized reports may be created on demand by ad-hoc reporting tool 62, a feature not generally in conventional workflow analysis tools, especially in combination with the other features of the preferred embodiments. The ability to create unplanned reports on data requested by the user is a desired feature of the preferred embodiments, as it can provide timely information targeted towards a specific need, such as a customer inquiry or troubleshooting endeavor. It will be understood that, while shown schematically as two separate entities, tracking user interface 40 and reporting user interface 60 may comprise a single computing entity, such as user interface 10, as shown in FIG. 1.

Figure 3:
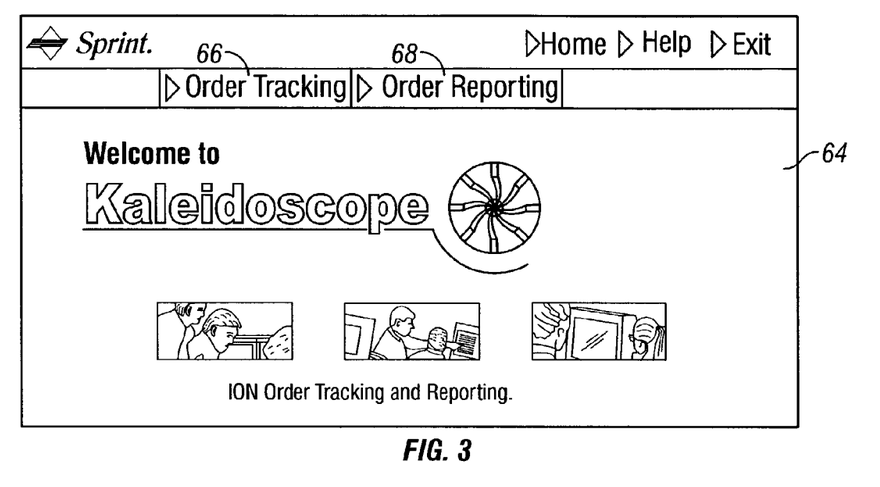
FIG. 3 shows a welcome screen of the preferred embodiments.
Figure 4:
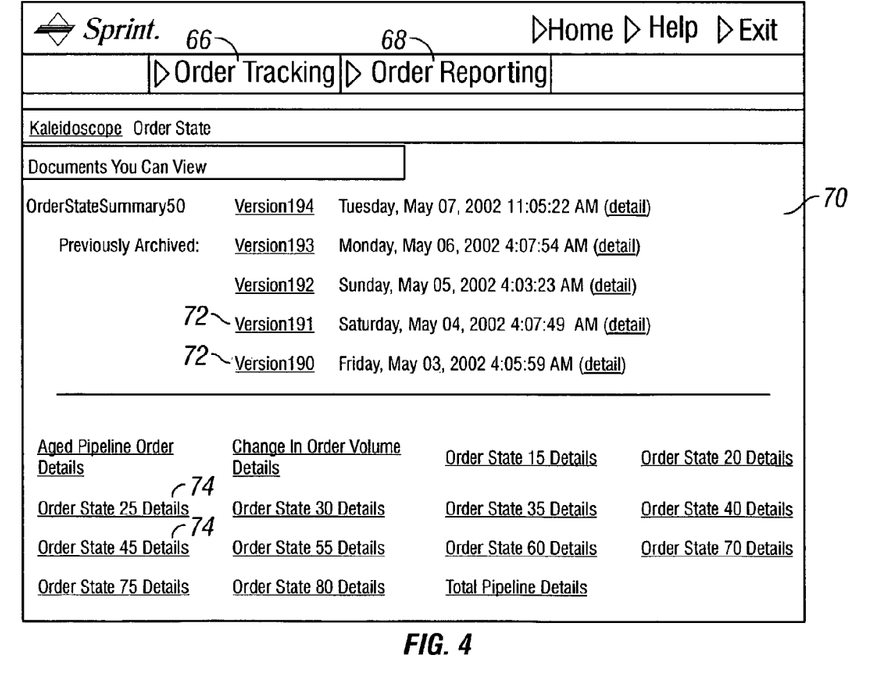
FIG. 4 shows an initial order reporting screen of the preferred embodiments.

FIG. 3 shows welcome screen 64 of a preferred embodiment. From welcome screen 64, a user may select between order tracking 66 or order reporting 68 hyperlinks. Selecting order reporting link 68 transfers the user to screen 70, as shown in FIG. 4, where a plurality of archived links 72 allow the user to view the status of orders at a specific state within the workflow on a specified date. Real-time links 74 also allow the user to view the status of all orders within a specific state, or alternately, every order within the workflow pipeline.

Figure 5:
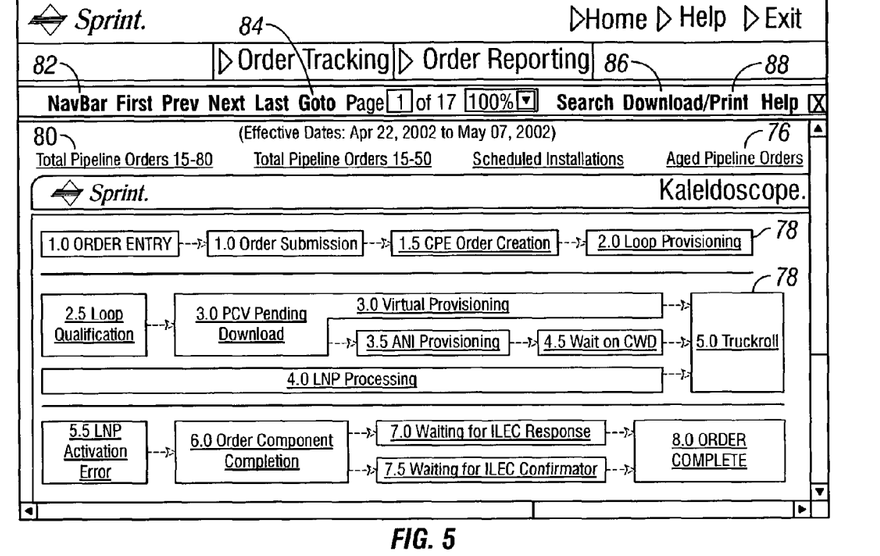
FIG. 5 shows an alternate order reporting screen of the preferred embodiments.
Figure 6A:
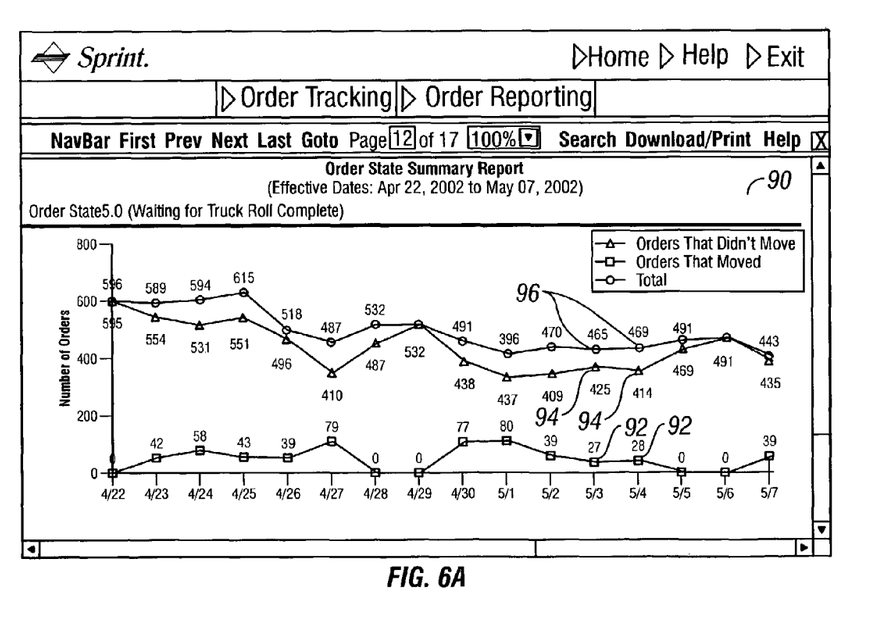
FIG. 6A shows an order state transition summary report of the preferred embodiments.
Figure 6B:
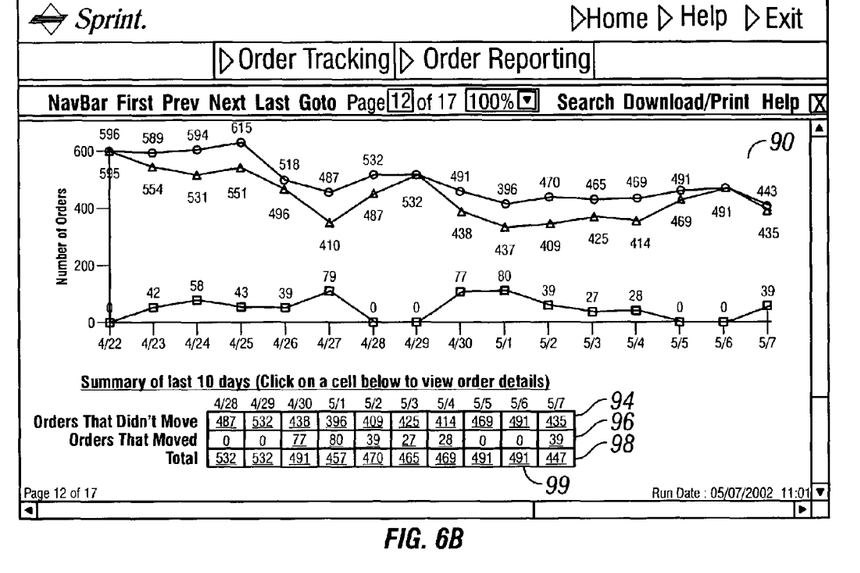
FIG. 6B shows a scrolled continuation of FIG. 6A, in accordance with the preferred embodiments.

Referring now to FIG. 5, screen 76 displays a layout of state-specific links 78. It will be understood that each state may be a composite state, i.e. a grouping of multiple workflow states that together represent a stage of the business process. Clicking on a particular state-specific link 78 will display every order within the selected state. Grouped state links 80 also allow a user to view the status of orders within a range of states, as well as scheduled installations or aged pipeline orders. Navigation bar 82 allows a user to scroll through links 78 sequentially by selecting goto option 84, or to alternately select download option 86 or print option 88. Selecting state-specific link 78 will bring up an order state summary report web page 90 as shown in FIG. 6A. A graph of number of time-stamped orders, shown herein as a function of date, allows a user to view orders 92 which transitioned out of the state, as opposed to orders 94 which did not transition to a new state on the particular date. A high occurrence of non-transitioning orders 94 when compared to total orders 96, or all orders in process that day, can alert users to a potential bottleneck. Scrolling down web page 90, as shown in FIG. 6B, non-transitioning orders 94, transitioned orders 96, and total orders 98 are displayed in table 99. Each selectable cell of table 99 links to details of an order category at a certain time or date.

Figure 7A:
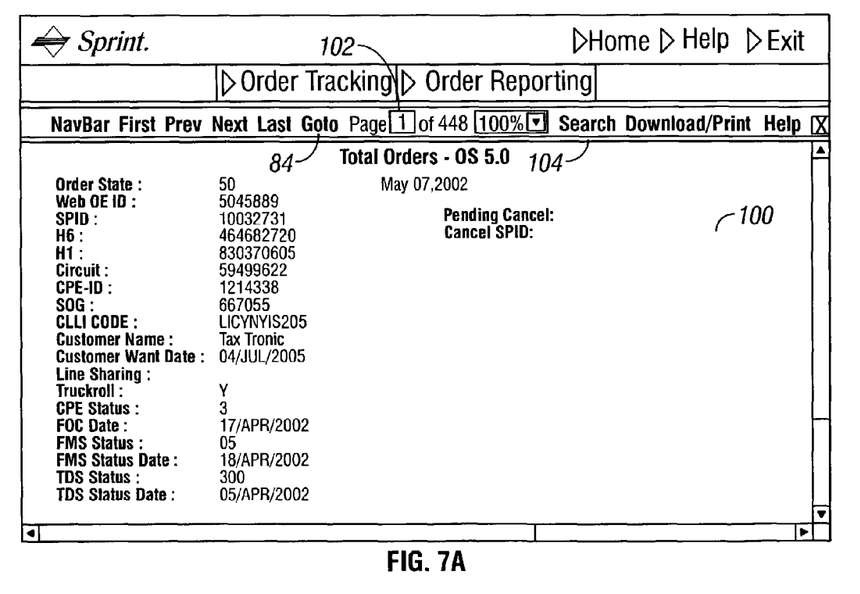
FIG. 7A shows a summary of total orders within a specified state, in accordance with the preferred embodiments.
Figure 7B:
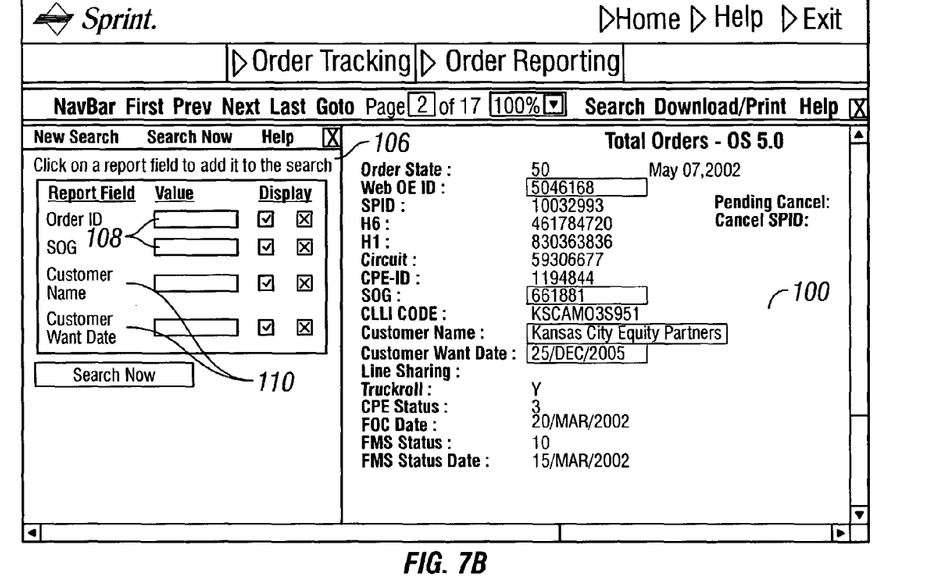
FIG. 7B shows a summary of total orders within a specified state and a search frame, in accordance with the preferred embodiments.

As an example, if total orders 98 for a specific date are selected, report field web page 100 is displayed, as shown in FIG. 7A, listing parameters and associated details for an order. Any order within total orders 98 can be viewed in web page 100 by entering its sequence number into selection field 102 and clicking goto link 84. Selecting search link 104 brings up search frame 106, as shown in FIG. 7B, which allows a user to search the collection of orders by entering values into fields 108 corresponding with various parameters 110.

Figure 7C:
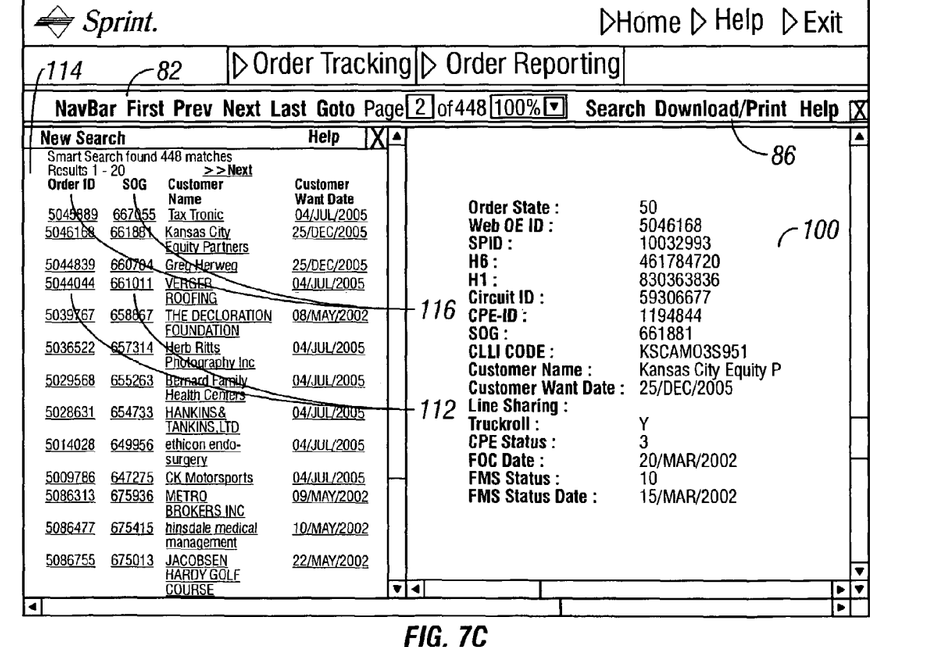
FIG. 7C shows a summary of total orders within a specified state and the results of a search, in accordance with the preferred embodiments.
Figure 8:
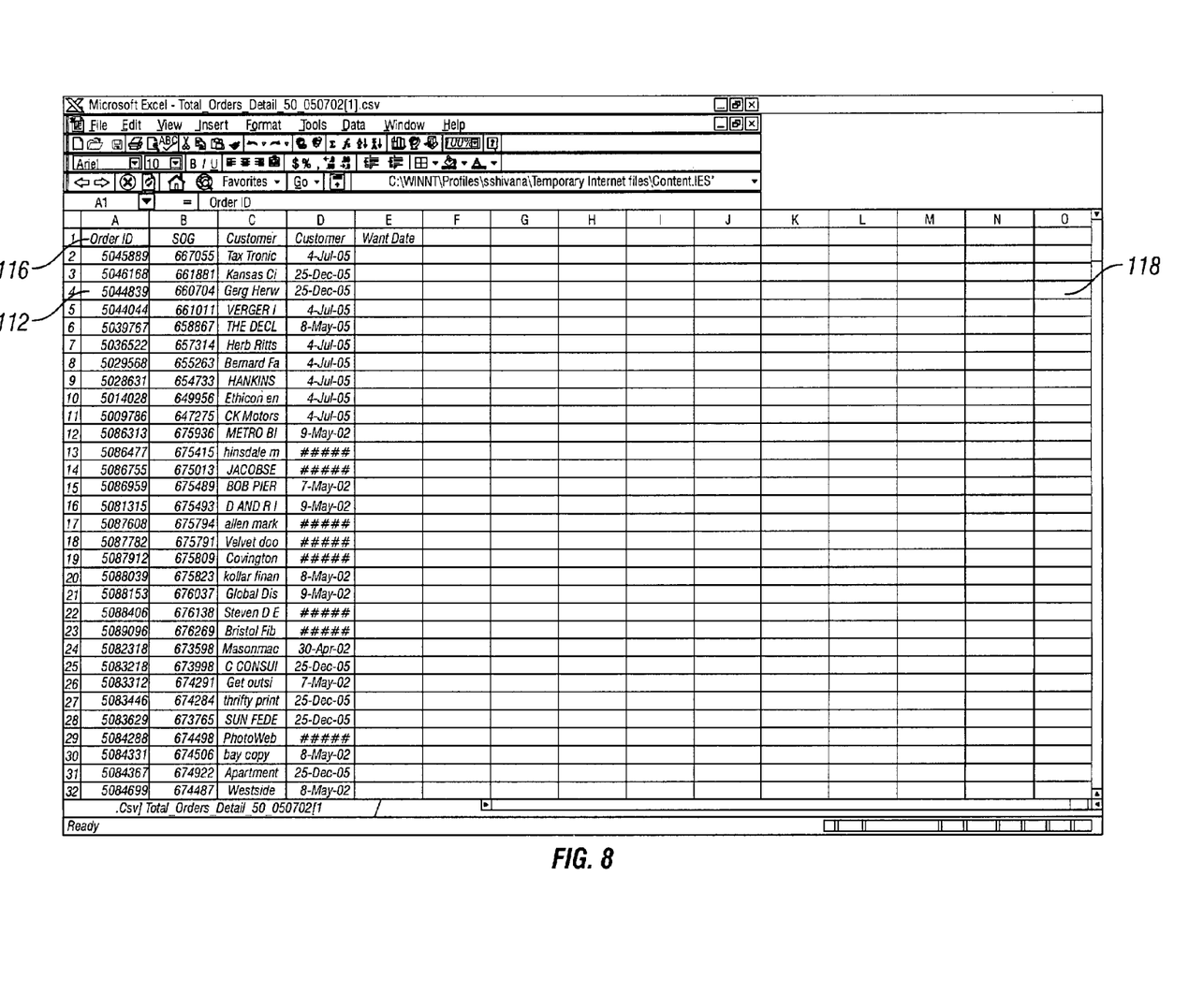
FIG. 8 shows a spreadsheet of order search data exported in accordance with the preferred embodiments.

Referring now to FIG. 7C, search result values 112 are displayed in results frame 114, listed under searched parameters 116. As search result values 112 are displayed as selectable links, each value 112 can be selected, allowing a user to further gain details associated with that specific value. For example, if result 112 corresponding with a specific customer name is selected, all orders associated with that particular customer will be displayed. Alternately, if result 112 of a certain customer want date is selected, all orders targeted for implementation by the selected date will be displayed. If download link 86 is selected from navigation bar 82, data displayed can be downloaded to a file for further analysis. As shown in FIG. 8, search result values 112 and associated parameters 116 can be exported to a spreadsheet 118, such as Microsoft Excel, for more custom graphing or mathematical manipulation. The ability to download and import data from the tool of the preferred embodiments allows a user to manipulate the data by statistical analysis software specifically designed for trend analysis or other statistical reporting. Trend analysis is an invaluable tool in crafting business forecasts and alleviating bottlenecks or other potentially troublesome areas within the workflow.

Figure 9:
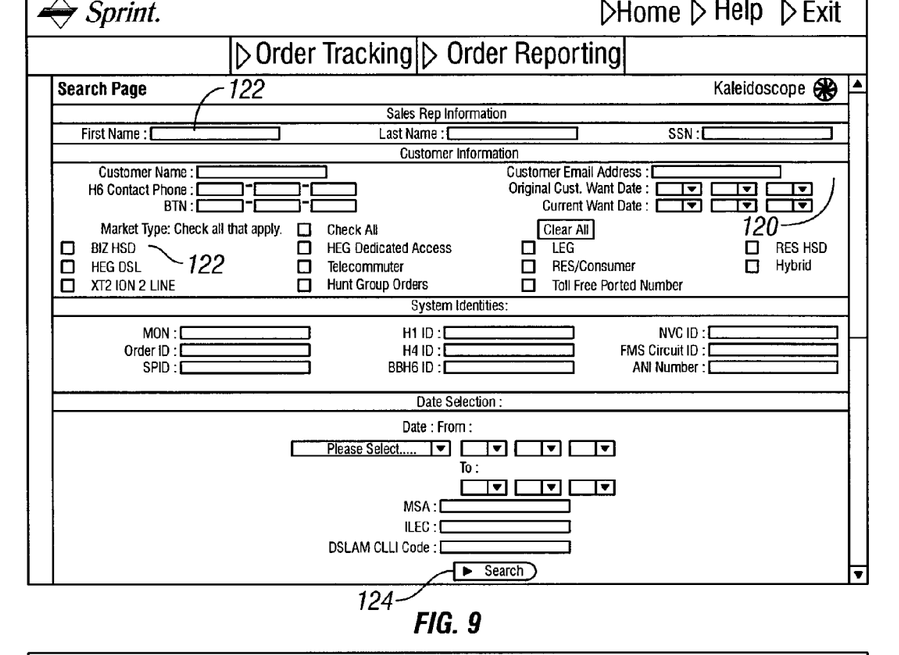
FIG. 9 shows an initial order tracking search screen of the preferred embodiments.
Figure 10:
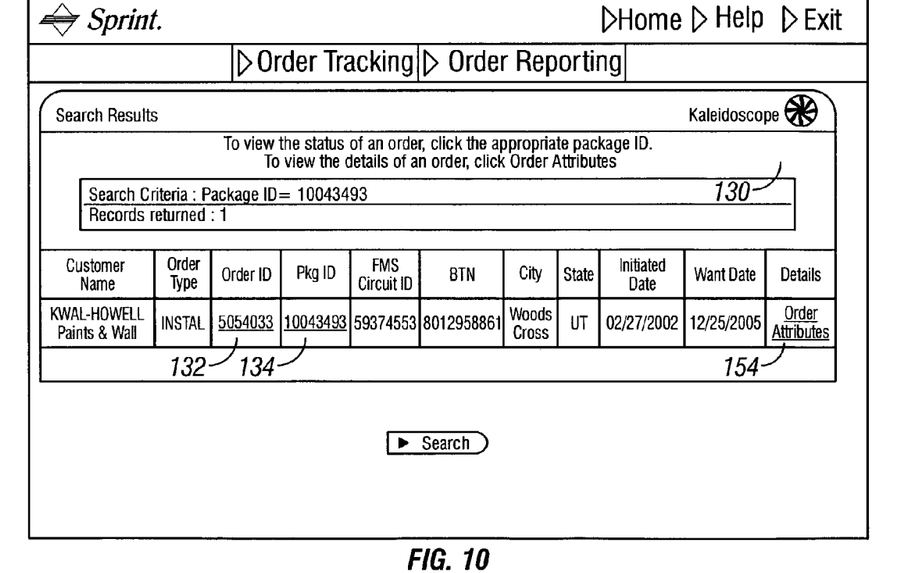
FIG. 10 shows an order tracking search results page exported in accordance with the preferred embodiments.
Figure 11:
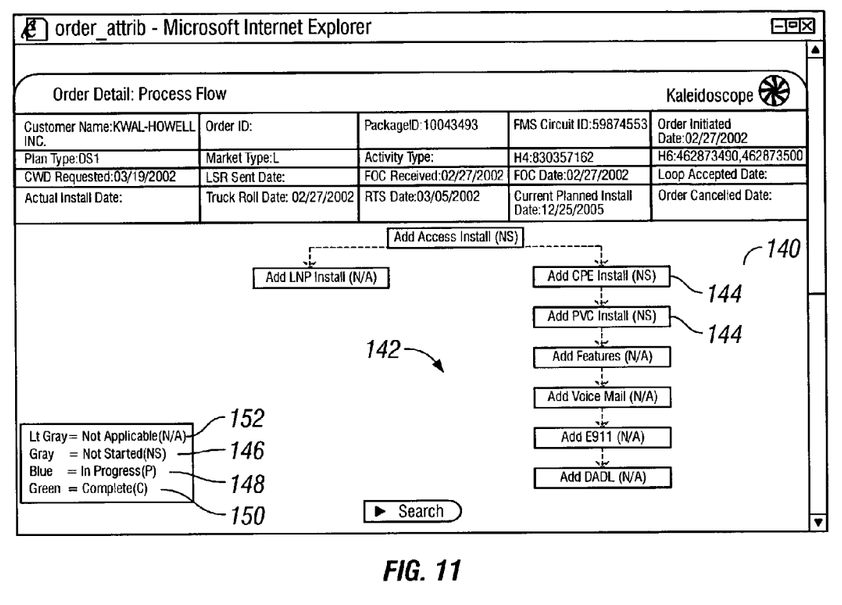
FIG. 11 shows a detailed process flow for an order displayed in search results.
Figure 12:
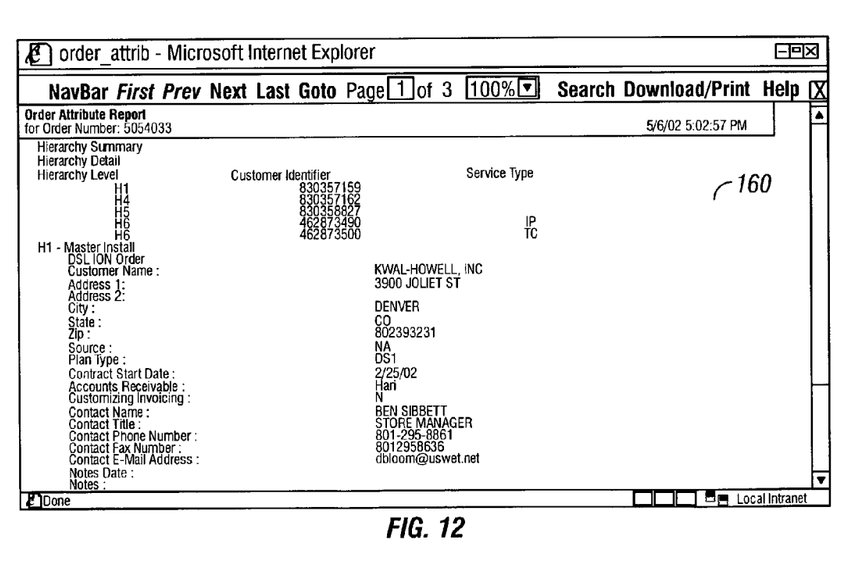
FIG. 12 shows an order attribute report of the preferred embodiments.

Referring again briefly to FIG. 3, if order tracking link 66 is selected, search page 120 as shown in FIG. 9 is displayed. Search page 120 includes a number of fields 122 that can be completed, checked, or selected to customize the results of the search. Clicking button 124 executes the search, bringing up results page 130 as shown in FIG. 10. Certain result values 132 may be hyperlinked, meaning they may be clicked for further details associated with the value. Selecting a specific value 132, such as package ID parameter 134, displays process flow screen 140 as shown in FIG. 11. Process flow screen details order information, as well as a flowchart-like process flow 142 including color-coded blocks 144 representing steps not yet started 146, steps in progress 148, steps completed 150 and steps not applicable 152. Referring briefly back to FIG. 10, if order attributes link 154 is selected from results page 130, order attribute report 160, as shown in FIG. 12 is displayed. Order attribute report 160 contains further data on the specific order.

Figure 13:
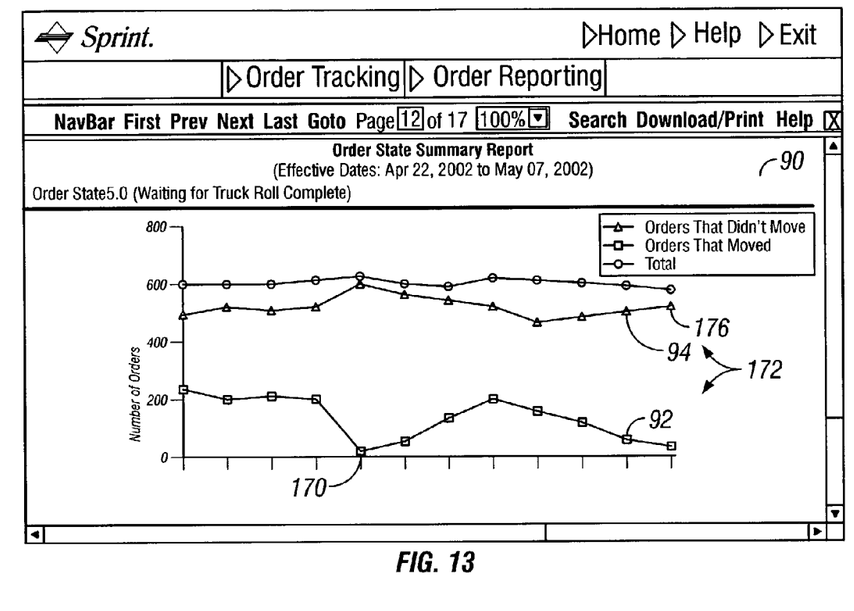
FIG. 13 shows an order state graph showing upward trending and bottleneck data.

Referring now to FIG. 13, an order state summary report 90 is shown as an example of how historical data can be used to check for bottlenecks 170 or trends 172. Bottlenecks can be detected by a relatively sudden rise of non-moving orders within a short time period, by a gradual increase in orders within a certain state over a period of time when no such trend is detected for other states, by a marked decrease in order completion, increasing cycle times or a number of other inconsistencies in data. Such effects can be detected graphically both by abrupt and significant changes in data point values or alternatively, by slow and steadily changing values. In addition, such effects can be identified numerically by values, such as moving orders 92 or non-moving orders 94 shown in FIG. 6B, that show sudden or steady changes. Sudden changes may indicate a system failure or failed task or state transition, whereas slow, steady changes over time may indicate order piling up due to insufficient computing capacity or inadequate headcount.

Referring again to FIG. 13, a date with a significantly higher occurrence of non-moving orders 94 than the prior date could potentially signify an occasion during which more capacity or personnel are needed, especially if a higher-than-normal number of total orders are in process that day. Daily charts of orders at various states (not shown) could also highlight particular states that need attention to prevent future bottlenecks. In addition, trends 172 can be identified by recognizing a plurality of data points 176 that are either increasing or decreasing steadily in value over a period of time. For example, the last several data points 176 in FIG. 13 are increasing for non-moving orders 94 and simultaneously, decreasing for moving orders 92.

Recognizing such a trend allows a user to note that action needs to be taken or to differently allocate resources to prevent the continuation of such a trend. For example, to improve operations, headcount overseeing a particular task could be increased, new or different automation measures could be implemented, and repairs or upgrades to systems or other equipment could be performed to improve order completion cycle times.

Figure 14:
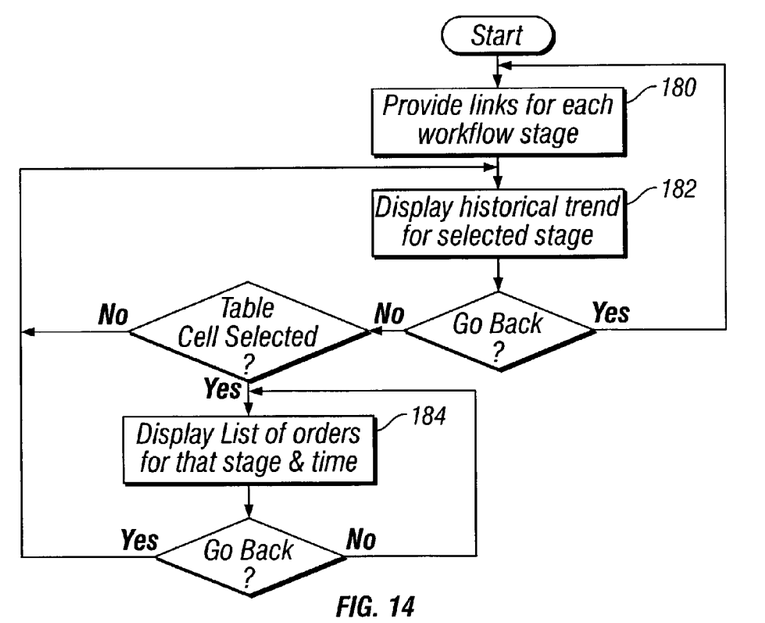
FIG. 14 shows an order reporting flowchart in accordance with the preferred embodiments.

Referring now to FIG. 14, a flowchart of the order reporting operations of the preferred embodiments is shown. In block 180, the user interface presents a set of selectable links, each associated with a stage in the workflow. (See for example FIG. 5.) When a user selects a link associated with a stage in the workflow, the user interface (in block 182) displays a historical trend of business process objects associated with that workflow stage. This historical trend is preferably shown both as a graph and as a table. (See for example FIGS. 6A and 6B). The table preferably includes selectable cells, each selectable cell having the number of business process objects associated with that workflow stage at a given time interval. This number may be the number of business process objects entering the stage during the time interval, exiting during the time interval, or simply remaining in the stage during the time interval. Other possibilities include the total number of business process objects in the stage at the beginning or end of the time interval. If a user selects a cell, the user interface (in block 184) displays a list of business process objects represented by the number in the cell. (See for example FIG. 7A, which shows the first page of a list). The user interface may display business process objects one to a page, with a page selection field and/or goto link allowing a user to view details for a selected business process object.

Figure 15:
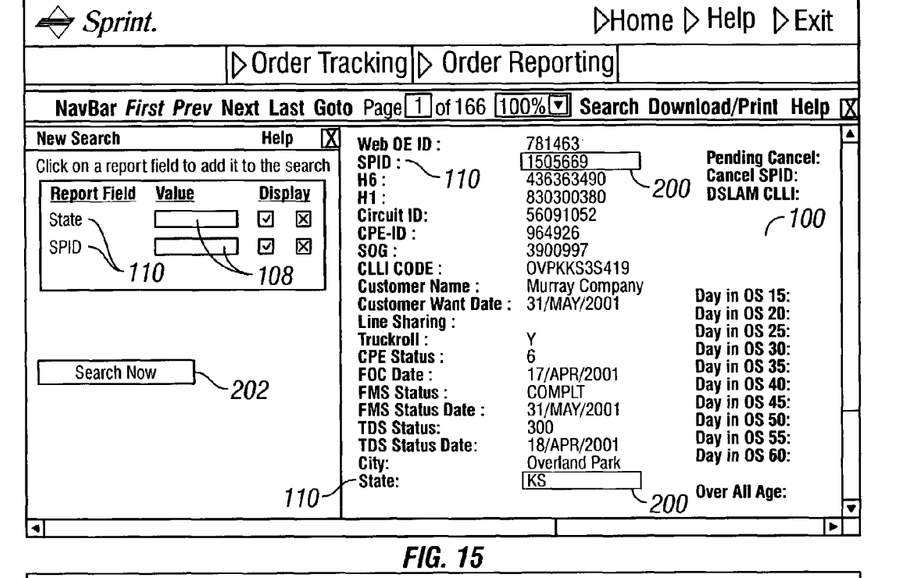
FIG. 15 shows a listing of order parameters and a customized search frame, in accordance with the preferred embodiments.
Figure 16:
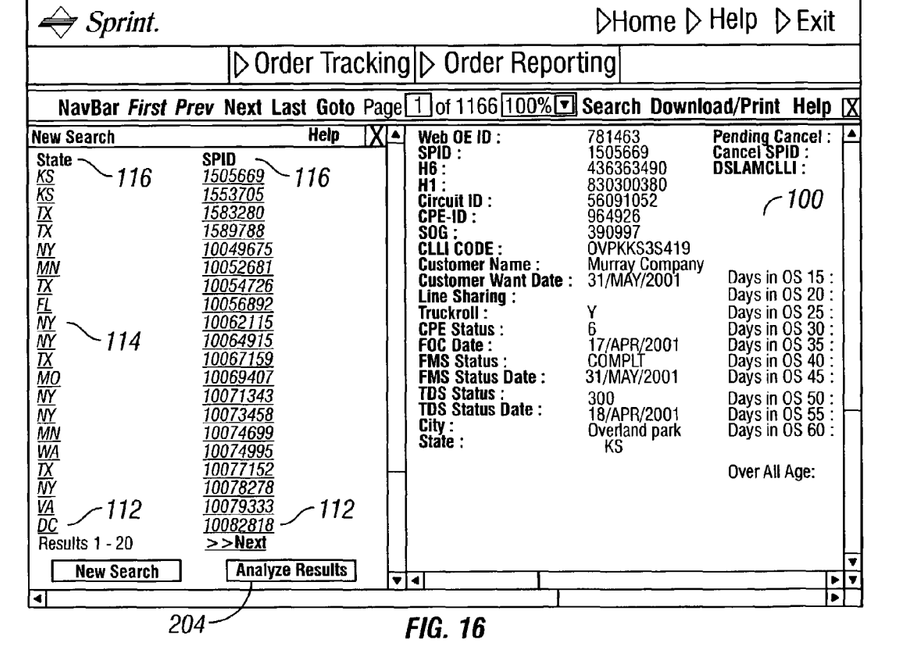
FIG. 16 shows a listing of order parameters and the results of a customized search, in accordance with the preferred embodiments.
Figure 17:
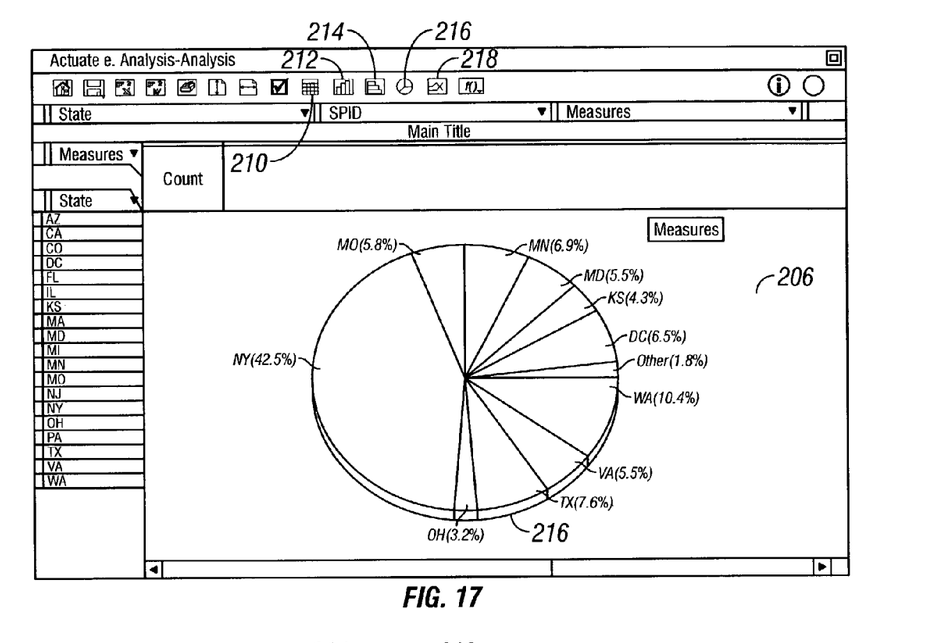
FIG. 17 shows an example of an ad-hoc report generated by custom search results, in pie chart form.
Figure 18:
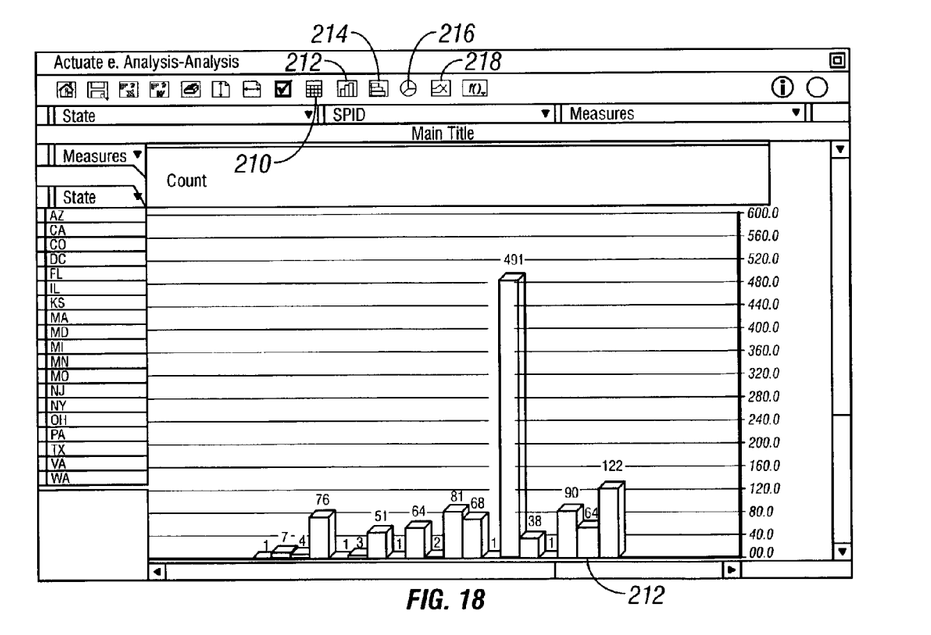
FIG. 18 shows an example of an ad-hoc report generated by custom search results, in vertical bar chart form.

The hyperlinked web pages of the preferred embodiments allow a user to delve deeper into displayed information. Often, nested hyperlinked are used, in which a hyperlink will take a user to a certain page with additional hyperlinks, allowing the user to dig even deeper into the order information. This ability is important to accessing all information desired, which allows a user to provide good customer support in order execution, as well as relay any potentially troublesome data so that a problem can be corrected or averted. In addition, custom searches may be devised instantly, as shown in FIG. 15, by clicking on any report field 200 in report field frame 100. Clicking on report field 200 instantly adds parameter 110 to search frame 106. A user can either enter values to search for into value fields 108, or if desired, leave them blank to display all pertinent results. After a search is completed by clicking on search button 202, search results frame 114, as shown in FIG. 16, displays the pertinent values 112 and associated parameters 116. Selecting analyze results button 204 compiles an ad-hoc report, an example of which is shown in FIG. 17. Analysis results screen 206 includes a selection of graph types in which to display the analyzed data, including tables 210, vertical bar charts 212, horizontal bar charts 214, pie charts 216, and line charts 218. An example of pie chart 216 and vertical bar chart 212 are shown, respectively, in FIGS. 17 and 18.

The workflow analysis tool of the preferred embodiments has the ability to query the real-time status of any order and identify its present state within the workflow, so that the status may be reported to the customer on demand. Further, the preferred embodiments allow a user to research all orders for a particular customer, across all processes within the workflow. In addition to only providing data in response to a search request, the preferred embodiments allow a user to quickly query even more detailed information, preferably by using hyperlinks within the results. Additionally, the tool of the preferred embodiments archives at least one year of data, so that historical reports can rapidly be generated, to be used to trend analysis, business forecasting or other business need.

The tool of the preferred embodiments allows a user to access a level of workflow detail comprehensive enough to identify the last transition made by an order, the last event or state associated with an order, as well as other details which could help identify the order status and cause of a delay. The preferred embodiments provide a web-based order tracking and reporting tool which allows users to analyze a workflow, access a variety of order-related data on demand, through many levels of information, to download or print displayed data, and to create custom ad-hoc reports on specified parameters.

Reducing the cycle time an order spends completing a workflow is significant to raising revenues. Should an order become stalled due to a failure or bottleneck, it is imperative to customer satisfaction and employee productivity that the order status can be accessed rapidly and the problem corrected. It is also desired to obtain a level of workflow detail comprehensive enough to identify the last transition made by the order, as well as any other data which could help identify the order status and cause of the delay. In large corporations, thousands of hours every month may be spent researching order statuses, resulting in lost productivity. In addition, revenue lost due to unsuccessfully completed orders can be significant.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A workflow analysis tool comprising:
a system that collects state information of customer orders for products or services in a workflow, wherein the workflow includes multiple stages fulfilling the customer orders, and wherein the state information for each of the customer orders includes an indication of a current one of the multiple stages in the workflow; and
a user interface coupled to the system that displays a selectable item for each of the multiple stages in the workflow, wherein upon selecting one of the selectable items the user interface further displays a historical trend of quantities of customer orders as a function of time associated with one of the multiple stages in the workflow corresponding with the selected selectable item,
wherein, for each unit of time in the historical trend, the historical trend includes a quantity of customer orders that have not transitioned out of the stage, a quantity of customer orders that have transitioned out of the stage, and a total quantity of customer orders in the stage,
wherein one or more of an increasing quantity of customer orders that have not transitioned out of the stage, a decreasing quantity of customer orders that have transitioned out of the stage, or an increasing trend in a quantity of customer orders in the stage when the increasing trend is not in others of the multiple stages of the workflow indicates a bottleneck in the stage,
wherein each of the quantities of customer orders associated with the stage is selectable, and
wherein upon selecting one of the selectable quantities, additional information associated with the selected quantity of customer orders is displayed.

2. The tool of claim 1, wherein said multiple stages in the workflow represent points along the workflow for fulfillment of the customer orders where customer orders at each of the multiple stages are subject to at least one of an action or operation and upon completion of the action or operation the state of the customer orders is changed.

3. The tool of claim 1, wherein said state information comprises state transitions associated with each customer order.

4. The tool of claim 3, wherein each state transition is time-stamped.

5. The tool of claim 1, wherein the historical trend is displayed as a graph.

6. The tool of claim 1, wherein the historical trend is displayed as a table.

7. The tool of claim 6, wherein the table includes selectable cells with the quantities of customer orders, and wherein the additional information includes a list detailing the customer orders represented by the selected quantities of customer orders.

8. A method of analyzing a workflow, the method comprising:
collecting state information associated with customer orders progressing through a workflow wherein the state information for each customer order includes an indication of a current one of multiple stages in the workflow;
displaying a web page providing a link for each of the multiple stages in the workflow;
displaying a second web page including a historical trend of linked quantities of customer orders as a function of time associated with a stage of the multiple stages in the workflow when a link corresponding to the stage is selected, wherein for each unit of time, the historical trend includes a linked quantity of customer orders that have not transitioned out of the stage, a linked quantity of customer orders that have transitioned out of the stage, and a linked total quantity of customer orders; and
displaying a third web page including additional information corresponding to customer orders associated with one of the linked quantities when one of the linked quantities is selected;
adjusting a resource allocation when the historical trend indicates a bottleneck in the stage.

9. The method of claim 8, wherein said state information comprises state transitions associated with each customer order.

10. The method of claim 9, wherein each state transition is time-stamped.

11. The method of claim 8, wherein the historical trends is displayed as a graph.

12. The method of claim 8, wherein the historical trend is displayed as a table.

13. The method of claim 12, wherein the table includes cells with the linked quantities, and wherein the additional information includes a list of customer orders represented by the selected linked quantity associated with the workflow stage at a time represented by a cell with the selected hyperlinked quantity.

14. The method of claim 8, wherein adjusting the resource allocation includes one or more of increasing a quantity of personnel for a particular task, implementing new or different automation measures, or repairing or upgrading equipment.

15. The method of claim 8, further comprising:
identifying a bottleneck in the stage through one or more of comparing the linked quantity of customer orders that have not transitioned out of the stage to the linked total quantity of customer orders, detecting an increase in the linked quantity of customer orders that have not transitioned out of the stage over a period of time, or detecting an increasing trend in a quantity of customer orders in a stage of the multiple stages of the workflow when the increasing trend is not detected in other stages of the multiple stages of the workflow.

16. A workflow management system comprising:
a workflow manager that coordinates activities of multiple systems to fulfill customer orders, wherein the workflow manager associates a state with each customer order, and wherein the workflow manager automatically changes the state of each customer order as that customer order progresses through a workflow; and
a workflow analysis tool that includes:
a database that receives information from the workflow manager regarding changes to customer order states; and
a user interface coupled to the database and that displays a selectable item for each of multiple stages in the workflow,
wherein upon selecting one of the selectable items the user interface further displays a historical trend of quantities of customer orders as a function of time associated with a stage of the multiple stages in the workflow corresponding with the selectable item,
where, for each unit of time, the historical trend includes a quantity of customer orders whose state has not changed, a quantity of customer orders whose state has changed, and a total quantity of customer orders,
wherein each of the quantities of customer orders associated with the workflow stage is selectable, and wherein upon selecting one of the selectable quantities additional information associated with the selected quantity of customer orders is displayed.

17. The system of claim 16, wherein the historical trend is displayed as a table.

18. The system of claim 16, wherein the table includes selectable cells each containing a respective quantity of customer orders associated with the stage at a determinable time unit, and wherein the additional information includes a list of customer orders represented by the quantity in the selected cell.

* * * * *